July 7, 1964  C. OICKLE, JR., ETAL  3,140,411
A.C. NUCLEAR GENERATOR
Filed Sept. 12, 1960  3 Sheets-Sheet 1

INVENTORS.
CHARLES OIKLE JR.
EDWARD A. PINSLEY
BY Leonard F. Walbrid
ATTORNEY

July 7, 1964   C. OICKLE, JR., ETAL   3,140,411
A.C. NUCLEAR GENERATOR
Filed Sept. 12, 1960   3 Sheets-Sheet 2
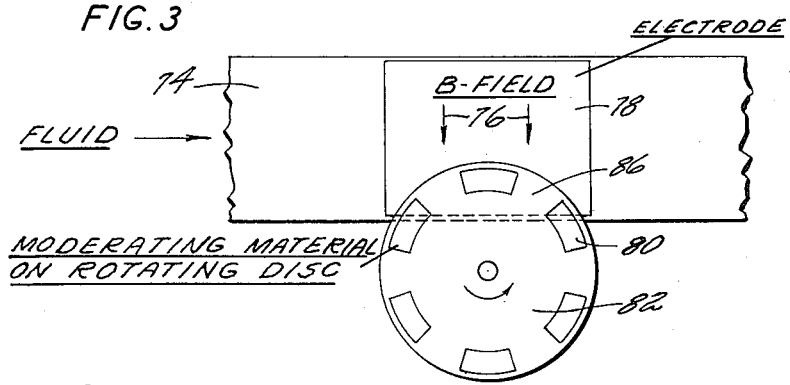
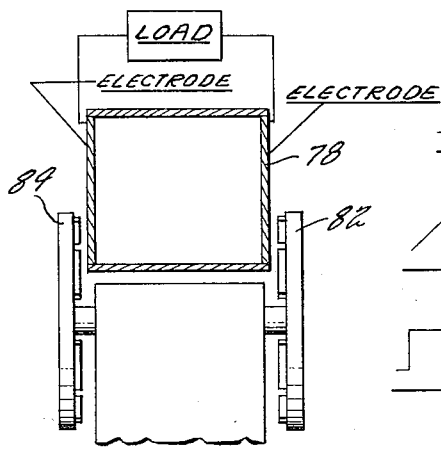
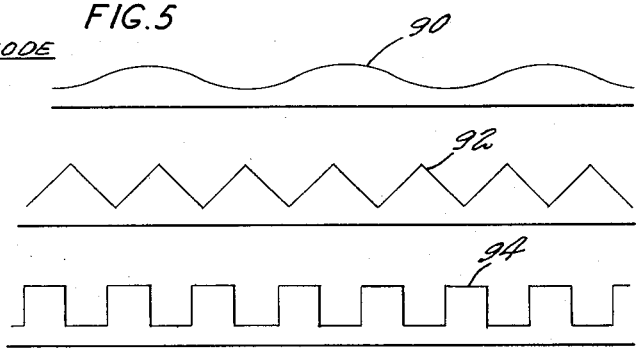
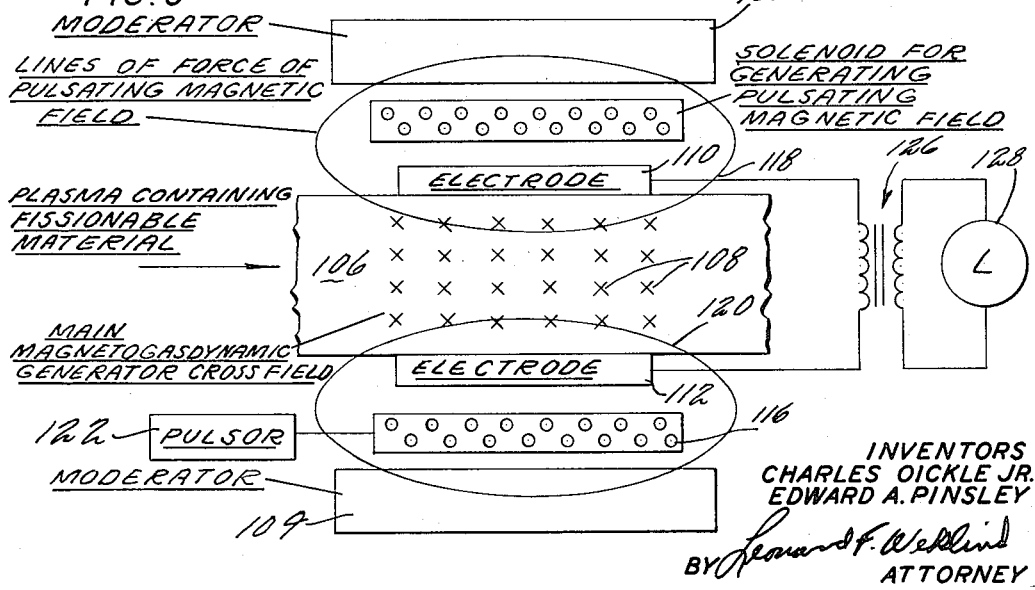
INVENTORS
CHARLES OICKLE JR.
EDWARD A. PINSLEY
BY
ATTORNEY

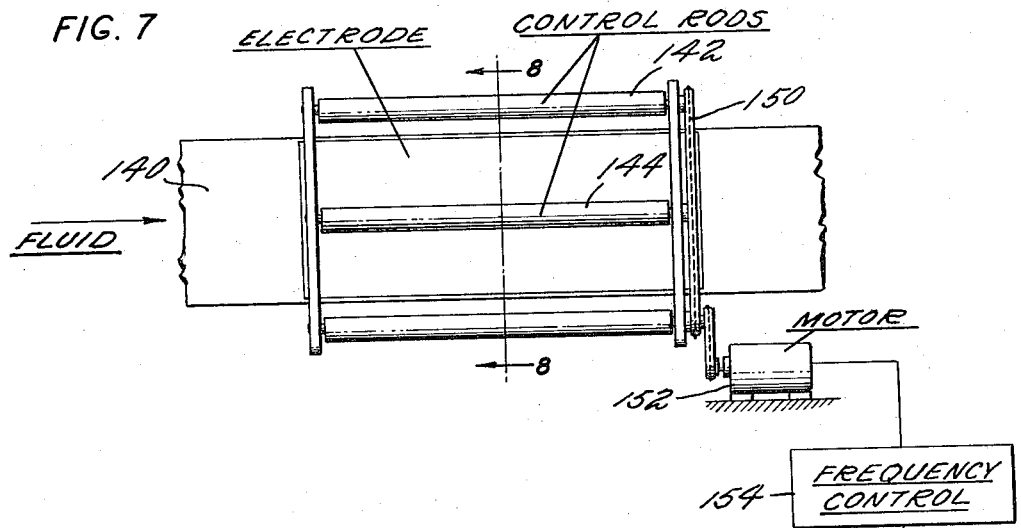
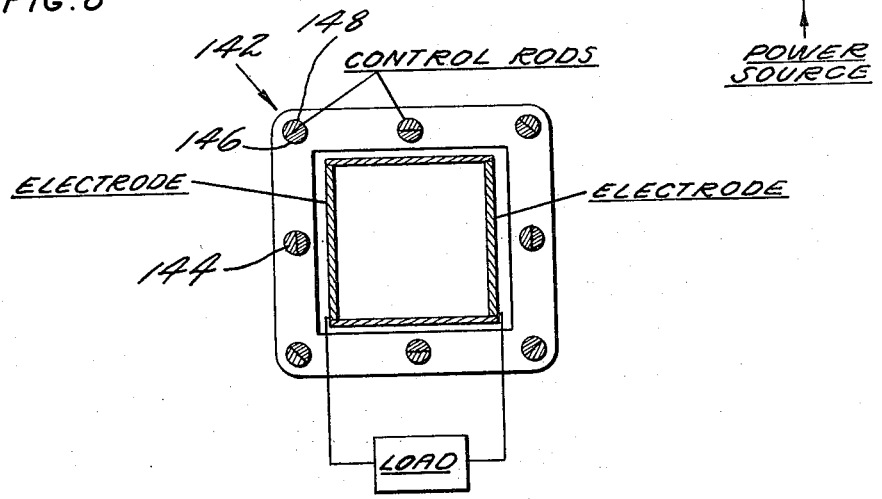

3,140,411
A.C. NUCLEAR GENERATOR

Charles Oickle, Jr., New Britain, and Edward A. Pinsley, Manchester, Conn., assignors to United Aircraft Corporation, East Hartford, Conn., a corporation of Delaware
Filed Sept. 12, 1960, Ser. No. 55,581
17 Claims. (Cl. 310—11)

This invention relates to nuclear magnetogasdynamic electric generators and more particularly to alternating current generators of this type.

Magnetogasdynamic nuclear generators which utilize a suitable nuclear material which in turn is dispersed in a working fluid, and which fluid passes through a magnetic field during fission, have been known but these have been limited to producing only D.-C. current. An example of this type of system is described and claimed in copending application Serial No. 44,601, filed July 22, 1960, by George McLafferty for Nuclear Magnetohydroelectric Generator.

In this type of generator a fissionable material is dispersed in the working medium and nuclear energy is liberated at a desired location in the cycle by a suitable arrangement of nuclear fuel and moderating material. The addition of nuclear energy produces heat which is sufficient to increase the electrical conductivity of the working fluid by thermal ionization such that direct-current magnetogasdynamic electric power generation ensues.

The present device has, as its primary object, the intermittent addition of nuclear energy to produce alternating current. This is accomplished by cyclically or periodically alternating the criticality condition of the fissionable material as, for example, by cyclically or periodically altering the location of fuel, moderator, control rods, channel walls, etc. or by varying the density of quantity of fuel, moderating or control rod material. The programming of this alteration of the criticality condition may be suitably controlled so as to provide substantially any form of alternating current wave patterns.

The foregoing primary object and other objects will become readily apparent from the following detailed description of the drawings:

FIG. 3 is a partial schematic showing of a modified arrangement showing a rotating assembly for the moderating material.

FIG. 4 is an end view of FIG. 3 with the working fluid duct in section.

FIG. 5 illustrates a group of developed patterns which the moderator material can assume to provide corresponding wave pattern.

FIG. 6 is a partial schematic of a modified A.-C. generator using a pulsating magnetic field.

FIG. 7 is a partial schematic of one possible control rod and moderator arrangement.

FIG. 8 is a section taken along line 8—8 of FIG. 7.

Figure 1:
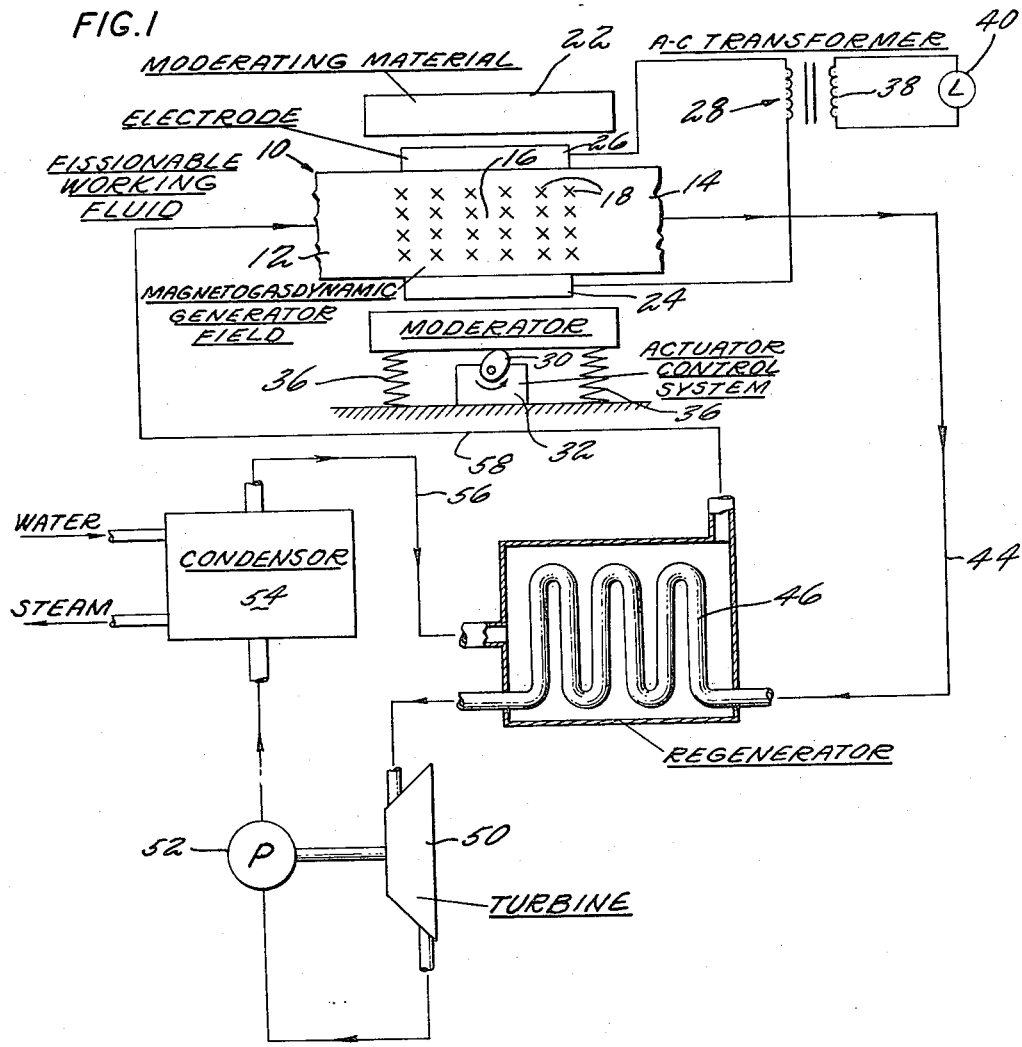
FIG. 1 is a schematic illustration of a closed cycle magnetogasdynamic alternating current generating plant.

Referring to FIG. 1, a main fluid duct is generally indicated at 10 and having an inlet end 12 and outlet end 14. A suitable working fluid containing uranium or other fissionable material in suitable form is caused to flow from the inlet to the outlet 14.

In the main generating region 16, a main generator magnetic field is provided as schematically shown at 18 with the lines of force running transversely to the axis or path of flow of the working fluid. As shown herein, the lines of force 18 run perpendicular to the plane of the sheet. Suitable elements 22 and 24 containing moderator material will cause the fissionable material to go critical in the main generating region 16 so as to fission, liberate neutrons, and add thermal energy to the fluid. As the temperature of the fluid is increased, the electrical conductivity of the fluid will increase, generally because of thermal ionization. An electromotive force exists because of the motion of the fluid across the magnetic field and if the electrical conductivity is increased, as the fluid passes through the magnetic field 18, a current will be generated in the electrode 26.

In order to generate a pulsating D.-C. current, at least a portion of the moderator means or material 24 is oscillated back and forth relative to the duct. This oscillation may be induced by any suitable means as for example an eccentric or cam 30 which is driven by a controlled actuator 32 at a predetermined speed or frequency. Springs 36 maintain the moderator portion 24 in contact with an eccentric 30. Alteration of the location of the moderator material causes the criticality condition to pulsate, and hence the thermal energy release to pulsate, and hence the degree of ionization and electrical conductivity to pulsate. This causes the electrical current passing through electrodes 24 and 26 to pulsate. The pulsating current is fed to the transformer 28 and is then transformed into A.-C. current at the output 38 which in turn connects to any desired load 40.

The remaining cycle for the working fluid is similar to that disclosed in the above-referred to McLafferty application. In essence, the working fluid passes from the outlet 14 to a line 44 and into a heat exchanger coil 46 in a regenerator 48. The working fluid then passes through a turbine 50 which is boot-strapped to a pump 52 whose outlet leads to a condenser 54 which in turn acts as a heat rejection unit for the system. From the condenser the working fluid is conducted via line 56 through a regenerator 48 and then via the line 58 to the inlet 12 of the main generator duct 10.

Figure 2:
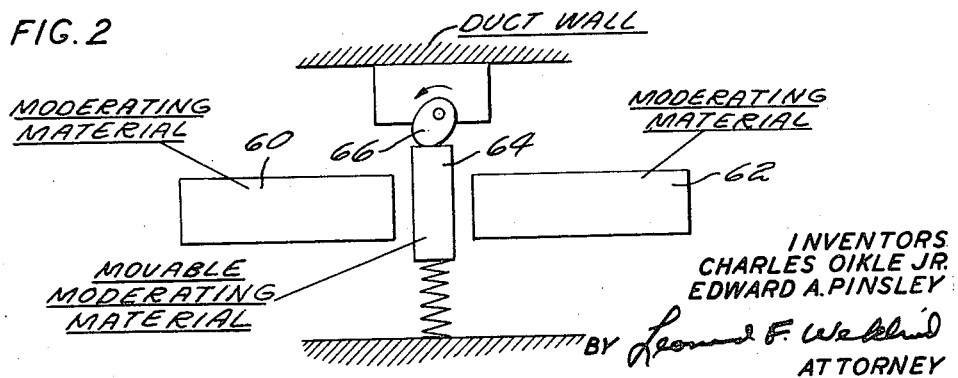
FIG. 2 is an enlarged schematic of a modified arrangement for oscillating the moderator material.

FIG. 2 shows an alternative means for moving a part of the moderator material. The bulk of the moderating material, as for example the sections 60 and 62, may be stationary while a movable portion 64 thereof may be oscillated by an eccentric 66 in much the same manner as in the FIG. 1 arrangement.

FIGS. 3 and 4 show a modified arrangement for producing the pulsating electrical current with the parts being shown in a relatively crude schematic. The working fluid will pass through the duct 74 across the main magnetic "B" field illustrated by the arrows 76. Suitable electrodes 78 may be provided. In this arrangement the moderator means comprising one or both of the moderating and control rod material may be formed in specifically shaped bits 80 which are imbedded in a pair of wheels 82 and 84 (see also FIG. 4). The wheels 82 and 84 may be driven at a predetermined speed with any suitable control thereof so that the fissionable material in the main fluid duct 74 will alternately go critical and subsequently subside as each moderator or control rod bit passes the critical region or as the next adjacent gap 86 between bits passes through this region.

FIG. 5 illustrates developments of the physical shape that the moderator and control rod material in the wheels 82 and 84 may assume so as to provide wave patterns of electrical energy having similar shapes. Thus, the pulsating current may be of sinusoidal form 90, or it may be of saw-tooth form 92, or a square-wave form 94.

It will be apparent that for a given controlled rotational speed of wheels 82 and 84 (FIG. 4) and with a desired moderator and control rod configuration (FIG. 5) any predetermined wave form and frequency may be obtained.

FIG. 6 shows an alternative pulsing device in which the moderator elements 102 and 104 are stationary or fixed relatively to the axis of flow of the working fluid through the main duct 106. The main magnetic field 108 may be provided by any suitable means and the usual electrodes 110 and 122 are also provided. In addition, a coil 116 is provided so as to induce a magnetic field schematically illustrated by the lines 118 and 120. This field is relatively smaller in magnitude than the main field 108. The coil 116 is provided with a suitable pulsating control 122 so that a pulsating secondary magnetic field 118 or 120 is generated. This field will cause the conducting fluid to alternately contract and expand, thereby effecting a change in criticality and consequent pulsations in the current being generated.

By means of a suitable transformer 126, an A.-C. current will be conducted to the load 128.

FIGS. 7 and 8 generally illustrate a modification of the device where the moderator and control rod material is moved with respect to the axis of flow through the main generator. Thus, the main generating duct 140 will have the other basic elements of the usual magnetogasdynamic generator. However, the moderating material will be imbedded in a plurality of control rods 142 and 144. Thus for example, the control rod 142 will have one-half section 146 containing a moderator and the other half section 148 containing a poison. Each of the rods is rotated in synchronous timed relation by a chain drive 150 which in turn is driven by a motor 152 whose speed is regulated by a frequency control 154.

It will be apparent that for a given rotation speed of the motor 152, the moderating material in each of the loads will cause the working fluid to go critical and then alternately cause the reaction to subside at a given frequency.

In each of the foregoing modifications the amount and type of fissionable materials in the gas could be selected to achieve criticality in the generating region. The gas utilized will have a density selected to provide an adequately high level of kinetic energy such that by utilizing a magnetohydrodynamic deceleration the desired amount of power can be extracted. In this connection, where pulsed generation is desired, reference may be had to literature on pulsed reactors. One such reference is the publication entitled, "Applications of Godiva II Neutron Pulses," by T. F. Wimett and J. D. Orndoff, contained in the proceedings of the Second United Nations International Conference on the Peaceful Uses of Atomic Energy, published by United Nations, Geneva, 1958, volume 10, pages 449–460. As to other reactor parameters, attention is also invited to the publication "Notes on Reactor Analysis," Parts I and II, ORNL–CF–54–7–88, by Robert V. Meghreblian and David K. Holmes, and published by Office of Technical Services, Department of Commerce, Washington 25, D.C.

The gas composition is a matter of selection to give an electrical conductivity which is temperature sensitive so that as temperature increases the gas is ionized with a degree ionization which is a function of the temperature. In this regard, attention is invited to the publication entitled "The Physics of Fluids," published by American Institute of Physics, volume 2, No. 6, November-December 1959, pages 614 et seq.; see section entitled "Thermal and Electrical Properties of an Argon Plasma"; and also see page 620, section entitled "Temperature Dependence of Electrical Conductivity." Of further interest is an article entitled "Magnetohydrodynamic Acceleration of Slightly Ionized, Viscously Contained Gases," by G. Sargent Janes and James A. Fay, Avco-Everett Research Laboratory, a division of Avco Corporation, presented at Second Symposium on Advanced Propulsion Concepts, co-sponsored by Air Force Office of Scientific Research (ARDC) and Avco-Everett Research Laboratory, a division of Avco Corporation, October 7–8, 1959, at Boston, Mass. This article is contained in volume I, "Proceedings of Second Symposium on Advanced Propulsion Concepts" (1960), U.S. Government Printing Office (vol. 1, pp. 21 through 24).

As a result of this invention, it will be apparent that a practical and substantially simple means has been provided for producing an alternate current by means of nuclear magnetogasdynamic generators.

Although several embodiments of this invention have been illustrated and described herein, it will be apparent that various changes may be made in the construction and arrangement of the parts without departing from the scope of the arrangement.

We claim:

1. A magnetogasdynamic generator comprising a duct having an inlet and an outlet and a generating region therebetween, means for moving a fluid stream through said duct continuously in one direction, said fluid stream including a fissionable material dispersed therethrough at least while flowing in said generating region, moderator means surrounding said duct and extending a predetermined distance along the path of fluid flow to cause fission to free energy in the generating region, said fluid stream being electrically conductive while flowing in said generator region, means coacting with said fluid to produce electrical energy, means positioned with respect to said generating region for collecting said electrical energy, and means externally of said duct for systematically varying a parameter of operation of the generator whereby the final electrical energy produced is an A.-C. current.

2. A generator according to claim 1 wherein the effect of said moderator means is systematically altered.

3. A generator according to claim 1 including mechanism for systematically altering the criticality of the fissionable material.

4. A magnetogasdynamic generator comprising a duct having an inlet and an outlet, means for moving a fluid stream through said duct continuously in one direction, said fluid stream including a fissionable material dispersed therethrough, moderator means surrounding said duct and extending a predetermined distance along the path of fluid flow to cause fission to ionize said fluid stream, said stream being electrically conductive at least in the generating region, means coacting with said fluid to produce electrical energy, means positioned adjacent said duct in substantially juxtaposed relation with said moderator means for collecting said electrical energy, and means externally of said duct for systematically varying the production of said electrical energy to produce A.-C. current.

5. A magnetogasdynamic generator comprising a duct having an inlet and outlet, means for moving a fluid stream through said duct continuously in one direction including pump means, said fluid stream including a fissionable material dispersed therethrough, moderator means positioned about said duct, means for regulating the criticality of said fissionable material and providing a first regulating means, means providing magnetic lines of force passing through the path of flow and providing a second regulating means, means externally of said duct for systematically varying the effect of one of said first and second means to produce a pulsating current, electrode means positioned adjacent said duct in close relation with said moderator means to collect said current, and means receiving pulsating electrical current from said electrodes.

6. A generator according to claim 6 including means for controlling the rate of fission and the electrical output at said electrodes.

7. A generator according to claim 6 including means for systematically varying at least a portion of said magnetic lines of force.

8. A magnetogasdynamic generator comprising a duct having an inlet and an outlet, means for moving a fluid stream through said duct continuously in one direction, said fluid stream including a fissionable material dispersed therethrough, moderator means adjacent said duct and extending a predetermined distance along the path of fluid flow to cause fission to ionize said fluid stream, means including a magnetic field running transversely of said stream and coacting with said fluid to produce electrical energy, electrode means positioned adjacent said duct in substantially juxtaposed relation with said moderator means whereby the electrode means overlaps at least a portion of said moderator means, said electrode means collecting said electrical energy, and means externally of said duct for systematically varying the production of said electrical energy to produce A.-C. current.

9. A generator according to claim 8 including means providing a selected frequency and wave form of said A.-C. current.

10. A magnetogasdynamic generator comprising a duct having an inlet and an outlet, means for moving a fluid stream in said duct continuously in one direction, said fluid stream including a fissionable material dispersed therethrough, moderator means surrounding said duct and extending a predetermined distance along the path of fluid flow, means providing magnetic lines of force running transversely to the flow of fluid, electrode means positioned adjacent said duct in substantially juxtaposed relation with said moderator means to collect the current generated by the coaction of said fluid and said magnetic lines of force, control means externally of said duct for systematically varying the rate of fission to produce an A.-C. current, and a heat exchanger connected to the outlet end of said duct for cooling said fluid.

11. A magnetogasdynamic generator comprising a casing having an inlet and outlet, means for moving an electrically conductive working fluid stream from said inlet to said outlet and through said casing in one direction and in a circuitous path, said fluid stream including a fissionable material, means adjacent to said casing for causing a reaction of said fissionable material, means externally of said casing for systematically varying the effect of said last-mentioned means, means for generating a magnetic field within at least a portion of said casing whereby said field and said fluid coact to generate electrical current including means located adjacent said casing for collecting said current, and means for receiving electrical energy from said collecting means.

12. A generator according to claim 11 including means for systematically varying the distance of said reaction causing means with respect to said fluid stream.

13. A generator according to claim 12 wherein said reaction causing means includes a moderator means, and means for moving at least a portion of said moderator means with respect to the fluid path.

14. A generator according to claim 13 wherein said moderator means is of a predetermined physical shape to produce an A.-C. current of a predetermined wave configuration.

15. A magnetogasdynamic generator comprising a casing having an inlet and outlet, means for moving an electrically conducted fluid stream from said inlet to said outlet and through said casing continuously in one direction and in a circuitous path, said fluid stream including a fissionable material, means adjacent to said casing for causing a reaction of said fissionable material, electrode means adjacent said casing, means for generating a magnetic field within said casing position adjacent said casing and said electrode means, externally of said casing for pulsing at least a portion of said magnetic field, and means for receiving electrical energy from said electrode means.

16. A magnetogasdynamic generator comprising a casing having an inlet and outlet, means for moving an electrically conductive fluid stream from said inlet to said outlet and through said casing in a circuitous path, said fluid stream including a fissionable material, means adjacent said casing continuously in one direction and for causing a reaction of said fissionable material, electrode means located adjacent said casing, means for generating a main substantially fixed transverse magnetic field in said casing adjacent said electrode means, means externally of said casing for generating a pulsating secondary magnetic field in said casing to produce an A.-C. current, and means for receiving electrical energy from said electrode means.

17. A generator according to claim 16 including means for controlling the frequency of pulsation of said pulsating secondary magnetic field.

References Cited in the file of this patent
UNITED STATES PATENTS
1,717,413    Rudenberg _____ June 18, 1929

OTHER REFERENCES

August 1957, Nucleonics, pp. 50–55.
November 27, 1959, Electronics, pp. 82, 84, 85.
Westinghouse Engineer, July 1960, pp. 105–107.
August 1960, Astronautics, pp. 22–25, 82–86.

UNITED STATES PATENT OFFICE
CERTIFICATE OF CORRECTION

Patent No. 3,140,411                                  July 7, 1964

Charles Oickle, Jr., et al.

It is hereby certified that error appears in the above numbered patent requiring correction and that the said Letters Patent should read as corrected below.

Column 4, lines 61 and 64, for the claim reference numeral "6", each occurrence, read -- 5 --; column 6, line 14, after "means," insert -- means --; lines 20 to 22, strike out "in a circuitous path, said fluid stream including a fissionable material, means adjacent said casing" and insert the same after "and" in line 22, same column 6.

Signed and sealed this 15th day of December 1964.

(SEAL)
Attest:

ERNEST W. SWIDER
Attesting Officer

EDWARD J. BRENNER
Commissioner of Patents